United States Patent [19]
Park

[11] Patent Number: 5,330,378
[45] Date of Patent: Jul. 19, 1994

[54] FLOAT FOR ROPES

[76] Inventor: David E. Park, 426 Bon-Aire Ave., New Castle, Pa. 16105

[21] Appl. No.: 933,076

[22] Filed: Aug. 21, 1992

Related U.S. Application Data

[63] Continuation-in-part of Ser. No. 646,343, Jan. 28, 1991, Pat. No. Des. 329,486.

[51] Int. Cl.$^5$ .................................................. B63B 22/00
[52] U.S. Cl. ........................................ 441/133; 114/267
[58] Field of Search .......................... 441/129–131, 441/133; 405/26, 63, 66, 67, 158, 205; 114/241–243, 253, 266, 267; 43/43.1, 43.14, 44.57, 44.9, 44.91–44.93, 44.95; 403/326, 327; 285/921; 24/575, 588, 598.1; D21/236, 237; D12/316; D22/146

[56] References Cited

U.S. PATENT DOCUMENTS

| | | | |
|---|---|---|---|
| 637,445 | 11/1899 | Bullens | 24/575 |
| 2,395,892 | 3/1946 | Lontz | 441/133 |
| 3,237,221 | 3/1966 | Thompson | 441/133 |
| 3,332,043 | 7/1967 | Skinner et al. | 441/133 |
| 3,597,779 | 8/1971 | Morgan | 441/133 |
| 3,992,735 | 11/1976 | McCarthy | 441/133 |
| 4,188,679 | 2/1980 | Hollaender | 441/133 |
| 4,227,594 | 10/1980 | Kluger | 403/397 |
| 4,386,919 | 6/1983 | Kadono | 441/133 |
| 4,750,243 | 6/1988 | Davis | 24/598.1 |
| 4,985,007 | 1/1991 | Ellis | 441/133 |
| 5,197,912 | 3/1993 | Lengefeld | 441/133 |

Primary Examiner—Robert J. Oberleitner
Assistant Examiner—Clifford T. Bartz
Attorney, Agent, or Firm—Paul Bogdon

[57] ABSTRACT

A float assembly for buoying ropes, cables, pipelines, or any other type of line, completely surrounds the line to which it is attached. The assembly is formed from a plurality of preferably identical circumferentially adjacent float pieces. The pieces attach to one another along radial planes which contain semipermanent attachment means. As each chamfered circumferential piece is added to the last the line is gradually surrounded by the whole of all the pieces. This allows the float to be attached or removed to an existing long line without the need to thread the line through the float assembly. Bands or straps are used to permanently secure the individual float pieces in place upon the line. The line passage hole may be sized or shimmed so as to firmly secure the float assembly on the line.

9 Claims, 2 Drawing Sheets

FLOAT FOR ROPES

CROSS-REFERENCE TO RELATED APPLICATIONS

This is a continuation-in-part of my prior design application. Ser. No. 07/646343 filed on Jan. 28, 1991, now Patent No. D329,486; issued Apr. 15, 1992.

BACKGROUND OF THE INVENTION

1. Field of the Invention

The present invention relates broadly to the field of buoys and flotation devices. More specifically, it provides a multi-piece easily attachable flotation device for long slender objects of indeterminate length such as ropes, cables, chains, pipelines, and the like, hereinafter referred to generally as lines. The invention may be applied in any field where it is desired to suspend a line, or a load attached to that line, upon or within a fluid. The term fluid is used in its general sense and should be understood to include both the liquid and gaseous states of matter. It is contemplated, for example, that the buoy of this example could conceivably be constructed so as to be lighter than air (as a dirigible) and thus provide support for lightweight lines within the atmosphere for use as electromagnetic wave guides, antennae, or weather sensing devices.

More commonly, however, it is anticipated that this easily attachable buoy will most often be used to support lines on or near the surface of a liquid medium such as water. The most prevalent use in the field of recreational activities is expected to be for providing convenient flexibly arranged buoyancy for rope lines in swimming areas. These lines often serve as lane markers or lines of demarcation between adult and child zones in swimming pool settings, and as indicators of deep water or warnings of underwater danger in natural beach environments.

Another common recreational use for rope floats is to provide buoyancy for the handle end of water skiing tow ropes so a user may locate the tow handle from a position within the water. These ski tow floats are subject to severe conditions of wear and tear in normal use. The low cost and easy attachment of the float of this invention makes it feasible to simply replace a damaged float with a new float attached either to the tow rope or to a suitable portion of the tow handle.

Since this inventive buoy concept may be embodied in virtually any size, shape, material, and concomitant buoyant force, it will readily be appreciated that lines much heavier than ordinary rope could be supported. Moreover, accoutrements hung from or attached to these lines could also be easily supported. With these extensions in mind, the potential fields of application can be seen to be virtually limitless. The particular examples, mentioned herein, are to be understood as illustrative in nature and in no way fully encompass all the fields in which this invention might be used.

A less common but more serious use for rope or cable floats arises in the towing of a ship by a tug boat. Rope or cable when unsupported in water quickly sinks. Hence when comparatively long cable is used in towing another ship or a target, especially at low speeds, it is apt to sag deeply in the water unless supported by buoyant elements. When used in shoal waters it is thus apt to chafe on the bottom or to become snagged or fouled on obstacles which may be encountered on the bottom. The ease of forming my float into a streamlined shape, providing for easy towing through the water, as well as its quick and easy attaching to a tow rope, make it particularly adaptable for pontoon type supports for tow ropes required in the field of tow vessels.

The commercial fishing industry can benefit from the unique advantages of this invention. The easily attachable float of this invention could be used to provide temporary support and guidance for fish hook and net drag lines used by large fishing vessels. In this application the float buoys could be specially shaped so as to provide lateral spreading force to the fish net support as the propulsive force of the ship pulls the net through the water. Also, the easily detachable design of the floats would allow them to easily be stripped from the lines as they are reeled in by conventional winding machinery.

It is contemplated that much heavier lines, such as anchor chains, electrical conduits, or even petroleum pipelines could be adequately supported upon a fluid surface by large size floatation devices incorporating the features herein disclosed. One of ordinary skill will recognize the many fields of human endeavor that could benefit from such applications.

A relatively large float construction of this nature, still embodying the novel features of this invention, could effectively be used as a submarine hose support system. Such systems are used to transport liquids, such as crude oil, across a body of water in a submerged state, ie. from ship to shore and vice versa. Such floats function to form a suitable catenary line for the purpose of causing the loading hose line to be flexibly moved in response to sea wave action without buckling.

At the other end of the size spectrum, it is contemplated that this novel flotation device might even be used to float minuscule threads in tiny amounts of liquid so as to partition segments of the liquid surface from one another. For example, such an arrangement might be used in the field of biology for segregating culture growths in a petri dish or the like.

A line supported by the easily attachable flotation device of this invention could, in turn, support a mesh, curtain, impervious wall, or semipermeable membrane which hangs down into the fluid medium so as to isolate some portions of the fluid from others. This could conceivably be used to separate species or genders of aquatic animals housed in the same aquarium while at the same time allowing for nutrients, etc. to freely disperse throughout the entire aqueous volume.

When used in combination with submerged anchors or pilings a curtain or mesh as above could be supported within a liquid while at the same time not extending above the surface of the liquid. One example of this sort of use might be a submerged submarine detection or entrapment net in connection with national defense efforts.

All the above suggested fields and examples of use of this invention are concerned with using the novel buoy in combination with another element such as a line, a line and net, etc. One of ordinary skill will appreciate the fact that this buoy can also be used as a simple buoy in a conventional manner for all the presently existing uses for buoys, such as marking dangerous shipping channels. In these applications the primary advantage of this invention ties in its low cost, simplicity, and easy fabrication.

As can be ascertained from the above, the fields in which the invention may prove extremely useful are many and varied. The central unifying theme is the provision of an easily attachable or detachable fluid flotation device for a line of indeterminate length.

2. Description of the Prior Art

Prior inventions provide various flotation devices for lines and those known to me and considered closest to my inventive concept are discussed as follows:

U.S. Pat. No. 2,395,892, issued to D. M. Lontz on Mar. 5, 1946 shows a float consisting of two identical halves which are hinged together around a cable by hinges and fasteners. The pontoon type float is made of two sheet metal hulls which are welded so as to be air-tight for buoyancy. The float is complex and expensive to produce compared to the simple design of the instant invention.

U.S. Pat. No. 3,332,093 issued to D. H. Skinner et al on May 25, 1965, shows two types of floats for a submarine hose systems. The first type is hinged in a manner similar to Lontz above. The second type is made of two identically shaped segments with complementary mating tongue and groove portions which fit together to form the overall float assembly. The design of the complex tongue and groove arrangement is more expensive and less reliable than the simple planar mating surfaces of my invention. In addition my invention would be much easier to assemble in a hostile underwater environment.

U.S. Pat. No 4,985,007 issued to H. S. Ellis on Jan. 15, 1991, discloses a swimming lane marker system which incidentally shows a one piece float 34 in FIG. 1. This type of float must be threaded over the end of the rode upon which it rides, which is often a time consuming and difficult process. A further disadvantage of this type of float is the difficulty in maintaining the float in a fixed position on the rope during use.

U.S. Pat. No. 4,386,919, issued to M. Kadone on Jun. 7, 1983 discloses a float for submarine pipeline loading hoses. The float is made of two dissimilar pieces which are assembled together around a hose by a rather complex system of bosses, hinge pins, bolts, and clamps. A major difficulty with this float construction is that it is difficult if not impossible to mount it to a pipeline in a hostile underwater environment.

None of the above inventions and patents taken either singly or in combination, is seen to describe the instant invention as claimed.

SUMMARY OF THE INVENTION

The multi-piece float assembly of this invention is specially adapted for easy assembly in place around a line of indeterminate length. The end of the line need not be accessible to mount the float assembly of this invention. Integral fastening means are formed as part of the float pieces. Additionally, fastening straps or bands may be easily employed since the float pieces are formed with suitable circumferential grooves for such straps. Mounting and assembly of this float device is simple enough to be easily accomplished without tools in a hostile underwater environment. The lines referred to herein are meant to include ropes, cables, electrical conduits, pipelines, or any other type of line upon which it might be desired to attach a flotation device.

Accordingly, it is a principal object of the invention to provide an improved multi-piece float assembly for lines, such as ropes or the like, which may be easily attached or detached as desired.

It is another object of the invention to provide a multi-piece float assembly which is easy to manufacture in that each of the multiple pieces is identical.

It is a further object of the invention to provide a multi-piece float assembly which may be assembled in place around a line without tools.

Still another object of the invention is to provide a multi-piece float assembly in which the identical multiple pieces may be snapped together around a rope with sufficient structural integrity to function in a light duty use and which may additionally be strapped together for additional structural integrity in heavy duty use.

Another object of this invention is to provide a multi-piece float which may be easily maintained at a fixed position upon the line which it supports.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
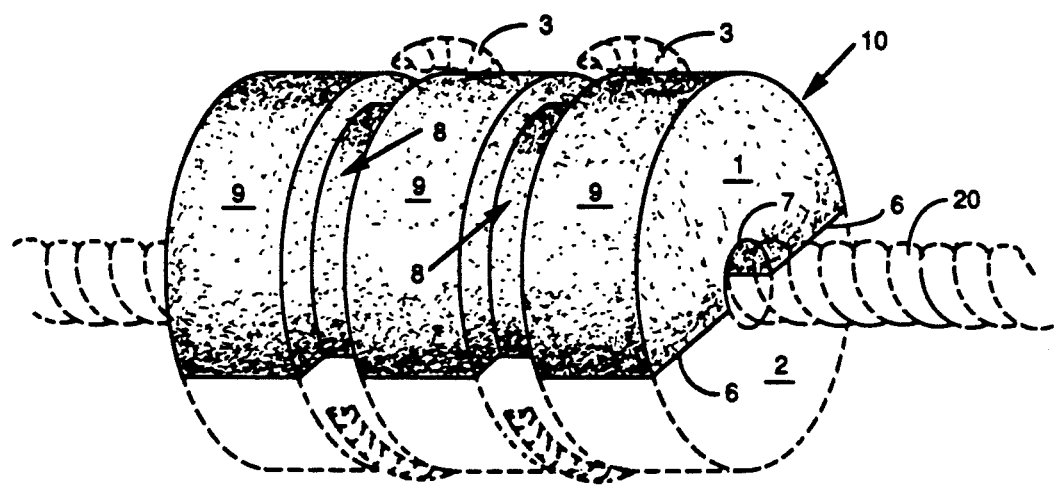
FIG. 1 is a perspective view of one piece of a multi-piece float shown in full lines with a mating piece, fastening cables, and a surrounded rope shown in hidden lines.

The present invention is shown in use in FIG. 1. with upper float piece I illustrated as it would be positioned with respect to a line 20 to be buoyed by the float assembly 10. Float assembly 10 includes upper float piece 1, complementary and identical lower float piece 2 (hidden tines in FIG. 1) and banding straps 3. Each individual float piece is formed as a semi-cylinder with external cylindrical surfaces 9 interrupted by semi-circular grooves 8. The grooves 8 are relatively shallow and are formed with a cross-sectional shape which corresponds with the cross-sectional shade of fastening bands 3. In this manner the half float pieces may be strapped or banded together without disturbing the smooth exterior contour of the float assembly. Also, the straps or bands will be held firmly in place and will not have a tendency to work loose.

In the preferred embodiment two identical semi-cylindrical float pieces are placed together along radial mating planes 6 to form a substantially cylindrical float assembly. It should be understood from the outset that the present invention is not limited to two float pieces being joined to form an overall cylindrical float. One of ordinary skill will readily appreciate that the number of float pieces forming the float assembly can be more than two. For example, three radial mating planes rotated 120 degrees from one another, or four mating planes rotated 90 degrees from one another could be used to form perfectly acceptable float assemblies of three or four identical float pieces. It will also be seen that there is no requirement that the individual pieces of the float assembly be identical although that is the preferred arrangement from the standpoint of economy of manufacture.

It should also be understood that the overall external shape of the float need not necessarily be cylindrical. For example, a football shape could obviously be used if desired. Generally an external shape that is a surface of revolution about the axis of the buoyed line is preferred for symmetric buoyancy and ease of manufacture. However, even this external shape of a surface of revolution is contemplated as not being necessary or even desirable for all possible uses of this invention. There may arise instances when it is desired to displace the center of buoyancy from the center of gravity of the float to achieve dynamic stability of the overall system. This can be accomplished by specially forming the float pieces so that they form an unsymmetrical overall float assembly when joined. An essential feature of this invention, applicable to all embodiments, is the essentially planar congruent mating surfaces of the various float pieces which are assembled in situ around the line to be buoyed.

In the illustrated embodiment, plane 6 is centrally divided with a longitudinal semi-cylindrical groove 7 that is concentric with the external semi-cylindrical surfaces 9. When two float pieces are joined along plane 6 the semi-cylindrical grooves 7 are aligned so as to form a cylindrical hole through the float assembly for the passage of the line to be buoyed.

The diameter of the cylindrical line passage hole 7 is preferably slightly less than the diameter of the line in order to form a snug fit and prevent the float from sliding longitudinally along the line. If the line for any reason has a smaller diameter than the line passage hole 7 small adhesive shims could be provided for placement in groove 7 prior to fitting the float assembly around the line to firmly secure the float asssembly to the line. It is contemplated that the line passage hole 7 could be formed with barbs or protrusions to firmly grip the outer surface of the line. Also, the line passage hole 7 need not necessarily be cylindrical. For example, the line passage hole 7 could be a square shape with a diagonal of the square being coplanar with the parting plane as shown in the prior U.S. Pat. No. 2,395,892 to Lontz which is hereby incorporated by reference. This type of line passage hole 7 has the advantage of gripping tightly around circular lines of varying diameters without causing excessive stress concentrations in the line.

Figures 2, 3:
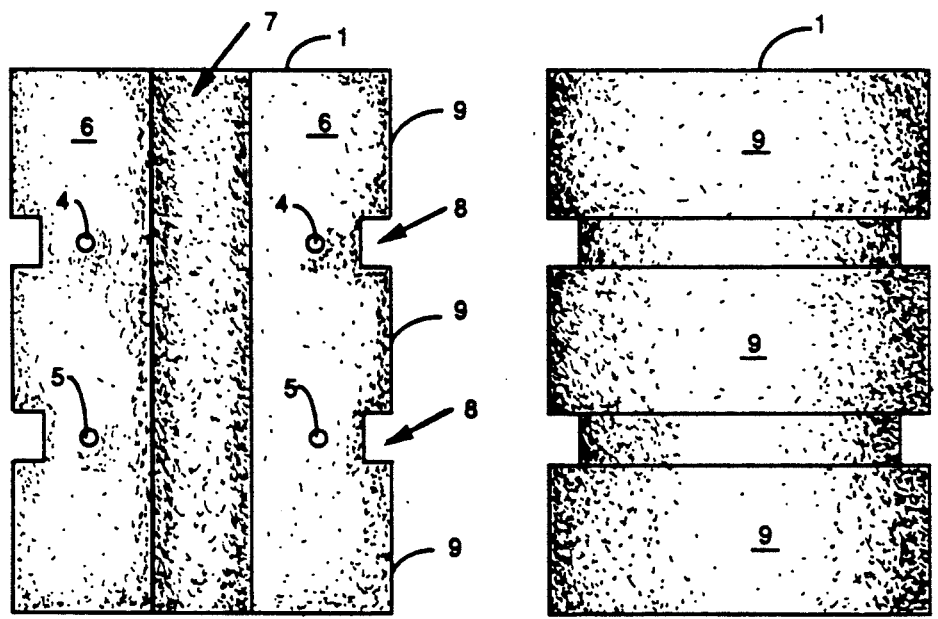
FIG. 2 is a bottom plan view of a float piece revealing the substantially planar mating surface.
FIG. 3 is a top plan view of the float piece.
Figure 4:
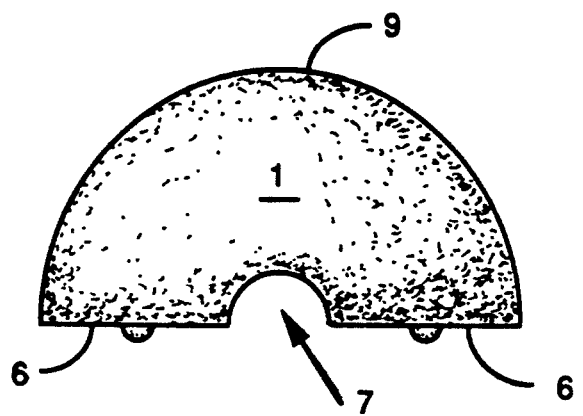
FIG. 4 is an end view of the float piece.
Figure 5:
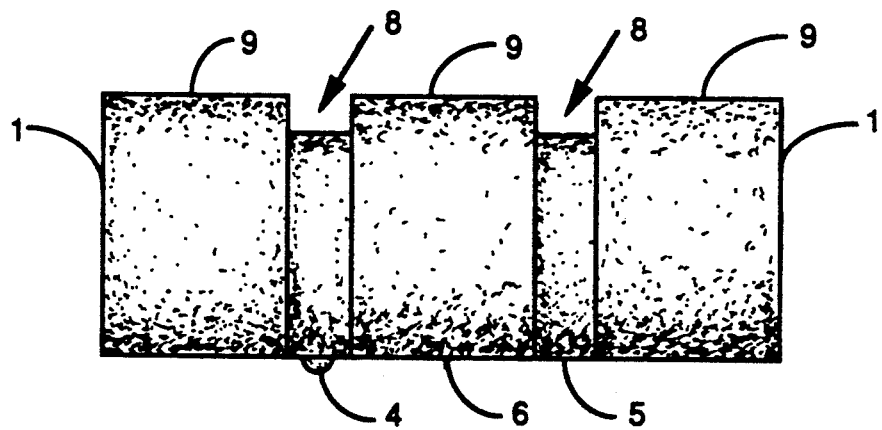
FIG. 5 is an elevation view of the float piece.

The substantially planar mating planes 6 are interrupted only by protrusions 4 and depressions 5 seen in FIGS. 2, 4, and 6. Protusions 4 are designed to form a snap fit with complementary depressions 5 on a mating radial float piece. Protrusions 4 and depressions 5 may be any conventional form of snap fit male and female type fasteners. Even conventional hook and loop fabric such as VELCRO may be used if precise alignment is not crucial to the particular application. The snap fitting of the separate float pieces together forms a float assembly which is structurally rigid enough for light duty use. If a stronger, more permanent, assembly is desired bands or straps 3 are attached so as to encircle the entire assembly with the snap fit forming a convenient way to hold the separate float pieces in radial alignment while the banding straps are applied. As mentioned previously, three or more radial pieces may be joined around a rope to form a single float assembly. It is also noted that a plurality of the float assemblies may be attached along the line to provide additional buoyancy if desired.

The actual physical form of the banding or strap is not a part of this invention, but it is desired that the bands should be easily applied and durable. It has been found that conventional plastic cable straps, as used for electrical cords, are suitable. Of course, one of ordinary skill will find other substantially equivalent types of banding such as, for example, elastic bungee cords as are commonly used on bicycles and motorcycles to secure various articles for carrying.

The material of the float may be constructed of uniform lightweight material such as expanded foam for light duty applications. Alternately a hollow metallic shell may be formed as discussed by Lontz '892.

The external coloration of the float may be suitably adapted to the particular use. It is anticipated that most uses would benefit from a highly visible coloration. However, if the floats were used in conjunction with fishing, as previously discussed, a color inconspicuous to the fish may be desirable.

It is to be understood that the present invention is not limited to the sole embodiment described above, but encompasses any and all embodiments within the scope of the following claims.

I claim:

1. A float assembly for providing buoyant support to a line of indeterminate length comprising;

a plurality of circumferentially adjacent pieces joined along adjacent substantially planar mating surfaces so as to form a volume of buoyant material surrounding a longitudinal hole suitable for passage of the line;

cooperating fastening means located on said planar mating surfaces to semipermanently fasten adjacent ones of said circumferentially adjacent pieces to each other, said cooperating fastening means comprising snap fit male and female type fasteners, whereby;

said volume of buoyant material forming said float assembly may be attached to a line so as to surround the line without the need to thread the line through said longitudinal hole, and said volume of buoyant material forming said float assembly may be removed from the line without pulling an end of the line out of said longitudinal hole and without the use of tools.

2. The float assembly according to claim 1, wherein said longitudinal hole is straight along the length of the line and is formed along the central edges of said planar mating surfaces.

3. The float assembly according to claim 2, wherein said chamfers are curved thus forming a round line passage hole.

4. The float assembly according to claim 1, wherein said longitudinal hole has a diameter formed or shimmed slightly smaller than the outside diameter of the line to be buoyed so as to firmly secure the float to the line without the use of additional securement means.

5. The float assembly according to claim 1, wherein said volume of buoyant material forming said float assembly is made from a hollow metallic shell.

6. A float assembly for providing buoyant support to a line of indeterminate length comprising:

a plurality of circumferentially adjacent pieces joined along adjacent substantially planar mating surfaces so as to form a volume of buoyant material surrounding a longitudinal hole suitable for passage of the line;

cooperating fastening means located on said pieces to semipermanently fasten adjacent ones of said circumferentially adjacent pieces to each other, said cooperating fastening means comprising: circumferential shallow grooves around the exterior surface of said pieces of laying in planes which are generally normal to the line; securing bands seated in said shallow grooves and passing entirely around said pieces, whereby said bands may be tightened around said pieces for semipermanently fastening adjacent ones of said circumferentially adjacent pieces to each other;

said volume of buoyant material forming said float assembly may be attached to a line so as to surround the line without the need to thread the line through said longitudinal hole; and said volume of buoyant material forming said float assembly may be removed from the line without pulling an end of the line out of said longitudinal hole and without the use of tools.

7. The float assembly according to claim 1, wherein said volume of buoyant material forming said float assembly has an external surface which is shaped as a surface of revolution about the longitudinal axis of the line.

8. The float assembly according to claim 7, wherein said surface of revolution is a cylinder.

9. The float assembly according to claim 1, wherein said volume of buoyant material forming said float assembly is made from expanded foam material.

* * * * *